United States Patent
Hsueh

(10) Patent No.: US 10,364,019 B2
(45) Date of Patent: Jul. 30, 2019

(54) AIRCRAFT FLAP MECHANISM

(71) Applicant: Thomas Hsueh, Anacortes, WA (US)

(72) Inventor: Thomas Hsueh, Anacortes, WA (US)

( * ) Notice: Subject to any disclaimer, the term of this patent is extended or adjusted under 35 U.S.C. 154(b) by 90 days.

(21) Appl. No.: 15/840,502

(22) Filed: Dec. 13, 2017

(65) Prior Publication Data

US 2019/0176963 A1 Jun. 13, 2019

(51) Int. Cl.
  *B64C 9/00* (2006.01)
  *B64C 9/16* (2006.01)
  *B64C 9/18* (2006.01)
  *B64C 9/20* (2006.01)
  *B64C 13/34* (2006.01)

(52) U.S. Cl.
  CPC .............. *B64C 9/20* (2013.01); *B64C 13/34* (2013.01)

(58) Field of Classification Search
  CPC .... B64C 9/00; B64C 9/16; B64C 9/18; B64C 9/20; B64C 9/22; B64C 9/24; B64C 9/26; B64C 13/34
  USPC ................ 244/87, 99.3, 210–215, 218, 219
  See application file for complete search history.

(56) References Cited

U.S. PATENT DOCUMENTS

| | | | | | |
|---|---|---|---|---|---|
| 4,361,299 | A | * | 11/1982 | Sharrock | B64C 9/16 244/216 |
| 4,469,297 | A | * | 9/1984 | Cole | B64C 13/30 244/215 |
| 4,471,928 | A | * | 9/1984 | Cole | B64C 9/00 244/215 |
| 4,475,702 | A | * | 10/1984 | Cole | B64C 3/48 244/214 |
| 4,753,402 | A | * | 6/1988 | Cole | B64C 9/22 244/210 |
| 5,544,847 | A | * | 8/1996 | Bliesner | B64C 9/24 244/214 |
| 5,686,907 | A | * | 11/1997 | Bedell | B64D 45/0005 244/194 |
| 6,149,105 | A | * | 11/2000 | Jaggard | B64C 9/28 244/214 |
| 8,628,045 | B2 | * | 1/2014 | Lauwereys | B64C 9/22 244/213 |
| 9,016,636 | B2 | * | 4/2015 | Parker | B64C 9/02 244/214 |
| 10,053,237 | B2 | * | 8/2018 | Huang | B64C 9/00 |
| 2007/0102587 | A1 | * | 5/2007 | Jones | B64C 9/22 244/214 |
| 2012/0012712 | A1 | * | 1/2012 | Eden | B64C 3/28 244/201 |
| 2012/0241564 | A1 | * | 9/2012 | Parker | B64C 9/22 244/214 |
| 2013/0126670 | A1 | * | 5/2013 | Vaghela | B64C 13/28 244/99.3 |
| 2015/0090843 | A1 | * | 4/2015 | Guering | B64C 3/50 244/215 |

(Continued)

*Primary Examiner* — Joshua E Rodden
(74) *Attorney, Agent, or Firm* — Triton Aerospace, LLC; Thomas Hsueh

(57) ABSTRACT

This invention relates to an aircraft flap mechanism, entirely contained within each flap, such that each flap can be activated independently of any other. The mechanism includes electric, pneumatic or hydraulic motors which activate the movement of the flaps.

The invention results in a compact, light, low cost, reliable and easy to maintain mechanism. Furthermore, due to the fact that the mechanism is entirely contained within the flap it maximizes internal wing space.

4 Claims, 5 Drawing Sheets

(56) References Cited

U.S. PATENT DOCUMENTS

2015/0298795 A1\* 10/2015 Parker ................. B64C 9/02
                                                                        244/214

\* cited by examiner

AIRCRAFT FLAP MECHANISM

BACKGROUND

Most aircraft utilize hydraulic actuators to provide movement to the flaps and ailerons through a system of linkages. The actuating mechanism on many commercial airliners consists of a lead screw which moves a nut up and down the length of the screw thereby driving one or more brackets attached to the control surface assembly. On aircraft having multiple flaps, each flap is actuated by its own lead screw mechanism. Each lead screw is driven by a shaft running along the length of the wing through a bevel or worm gearbox.

This type of arrangement is mechanically complicated, heavy, expensive to manufacture and maintain. Furthermore it does not allow each flap segment to be individually activated, controlled or programmed. This invention describes a mechanism which overcomes the above mentioned shortcomings.

SUMMARY OF THE INVENTION

The general aim of the present invention is to provide an improved wing flap assembly by means of a mechanism which is light, compact, easy to maintain and which allows each flap to be operated individually.

The disclosure is generally directed to an aircraft flap assembly which combines two electric, pneumatic or hydraulic motors coupled together powering two shafts, each with a pinion gear at the outboard end of the shaft. The pinion gears drive a carriage with four rollers which ride on tracks attached to the wing rib structure. Two rather than one motor are used to allow the flap to be operated should one motor fail. Each motor can provide enough power to operate the flap mechanism.

During extension of the flap, the track path is designed to lead the flap straight out for the first half of its motion along the track, then to direct the motion downwards to increase the flap angle. This track path design allows the flap to extend and stop half way before it starts its downward motion. In this position, the flap can increase the wing chord and aerodynamic lift without increasing the induced drag.

While the description of the invention relates to flaps, the invention is applicable to any aircraft control surface and it is to be understood that the specific reference to flaps is for illustration purposes only. Similarly, the shape of track bracket 2, as shown in the figures, is for a particular flap to wing attachment and is for illustration purposes only. Different track bracket shapes may be required depending on the type of control surface, whether such control surface is installed on a wing or fuselage, or on other design considerations. Each bracket will however have a similar track and rack design as described in detail below.

DETAILED DESCRIPTION

Figure 1:
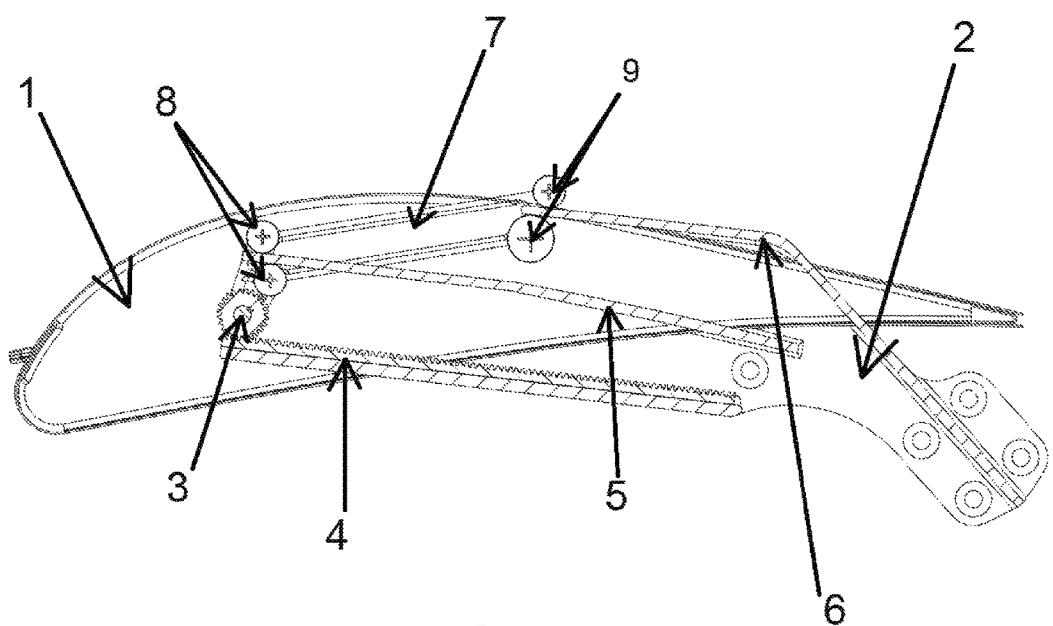
FIG. 1 is a side view of an airfoil flap 1 assembly when it is retracted

FIG. 1 shows the left side view of the flap assembly when it is retracted. Carriage 7 is attached to flap 1. Rollers 8 and 9 are fastened to carriage 7 and ride on tracks 5 and 6. Tracks 5 and 6 are integrated with track bracket 2, which is stationary and attached to the aircraft wing.

Figure 2:
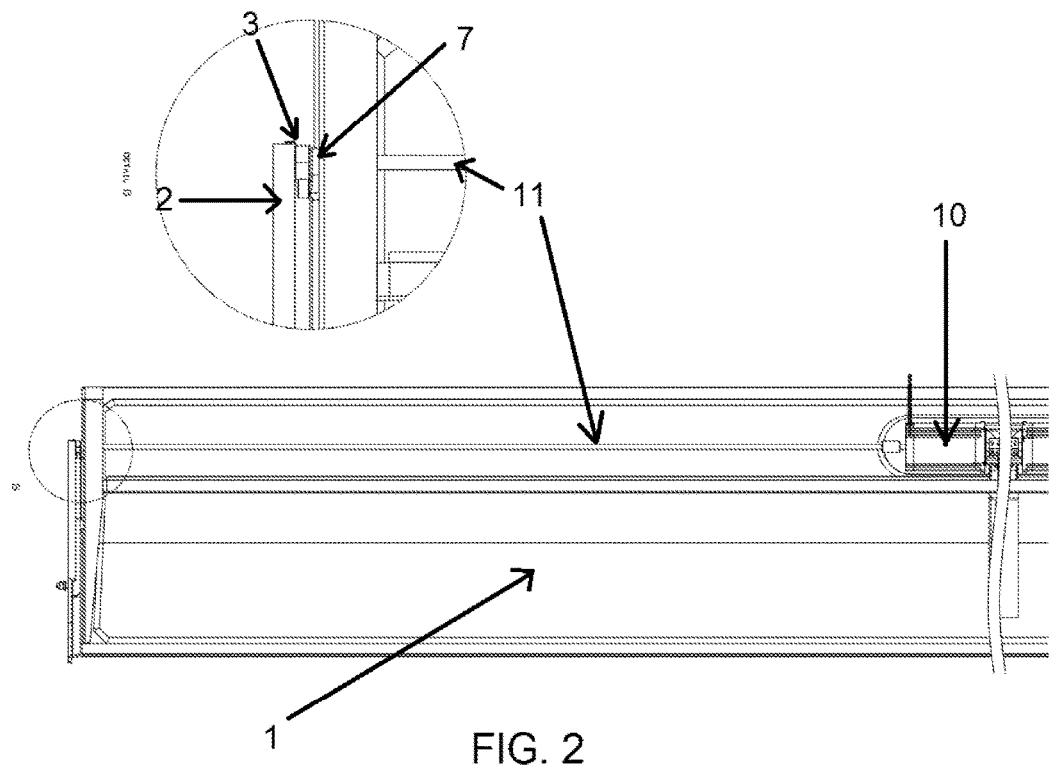
FIG. 2 is a half bottom view of flap 1 and a detailed view of the connection between shaft 11, carriage 7, pinion gear 3 and the track bracket 2.

FIG. 2 shows the left bottom view of flap 1 and a detailed view of the connection between shaft 11, carriage 7, pinion gear 3 and track bracket 2. The flap mechanism is symmetrically placed on both sides of flap 1. Thus the mechanism we describe is for only one of the sides, the other side being the same.

Motor 10 is placed inside the left half of flap 1 and connects to shaft 11. Shaft 11 goes horizontally through the flap 1 rib and fastens to pinion gear 3 on carriage 7. Pinion gear 3 rides on rack 4 (see FIG. 1) of track bracket 2. The arrangement is also shown in FIG. 3.

Figure 3:
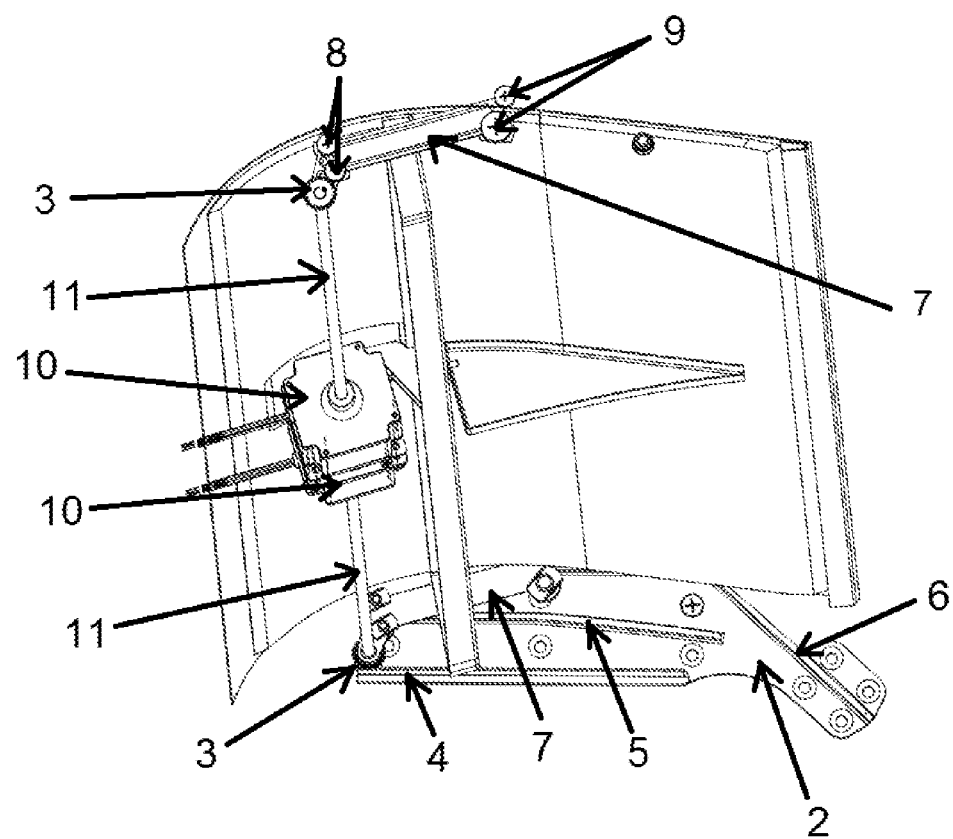
FIG. 3 is an inside view of flap 1, showing a clear arrangement of the mechanism.

FIG. 3 shows the inside of flap 1. The two motors 10 are interconnected and installed at the middle of flap 1. Therefore, when motors 10 receive activation signals, shafts 11 will both rotate synchronously and drive the two pinion gears 3 on each end of flap 1.

When motors 10 receive a signal to extend flap 1, shafts 11 start to rotate and, on each side of the flap, drive pinion gear 3 to move on rack 4. Pinion gear 3 moves carriage 7 and flap 1 together along rack 4. While carriage 7 is moving with pinion gear 3, rollers 8 are riding and moving on track 5; rollers 9 are also riding and moving on track 6 at the same time. For this mechanism, track 5 and track 6 provide a steady path for the movement of flap 1.

Figure 4:
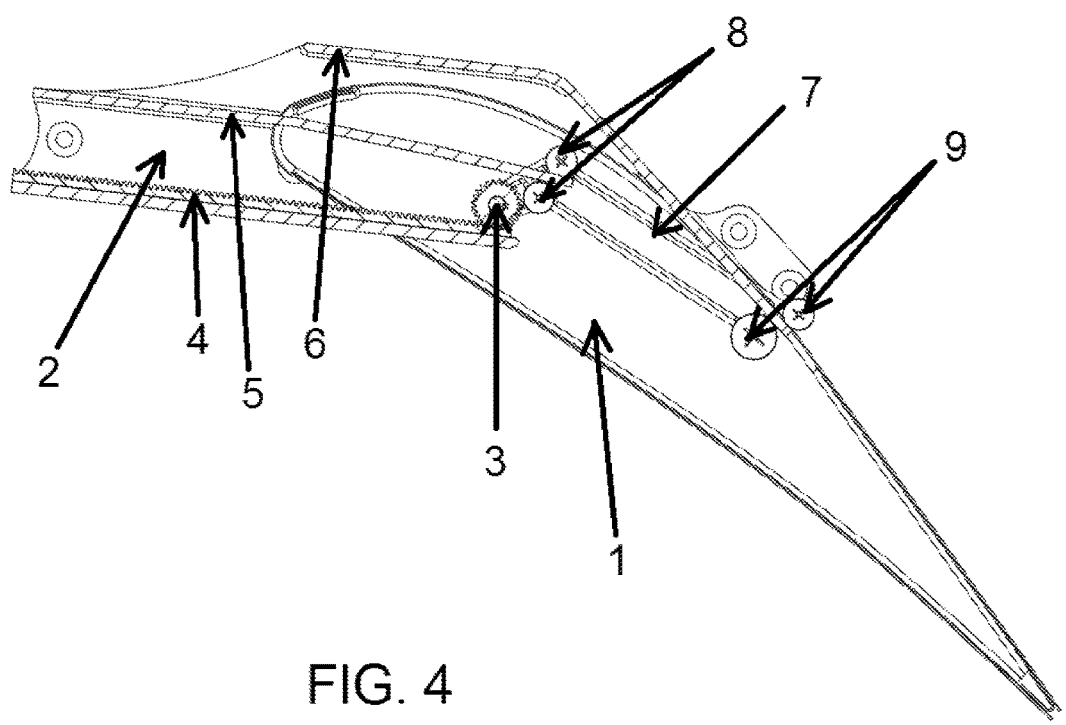
FIG. 4 is a side view of the airfoil flap 1 assembly when it is fully extended.

FIG. 4 shows the position when flap 1 is fully extended. Track bracket 2 stays in the same location since it is attached to the aircraft structure. Pinion gear 3, rollers 8 and rollers 9 along with carriage 7 have moved to the other end of track 5, track 6 and rack 4.

When a motor 10 gets the signal to retract flap 1, shaft 11 rotates in the reverse direction. Pinion gear 3 driven by shaft 11 starts to move back along rack 4. Rollers 8 and 9 also start to move back on tracks 5 and track 6.

Figure 5:
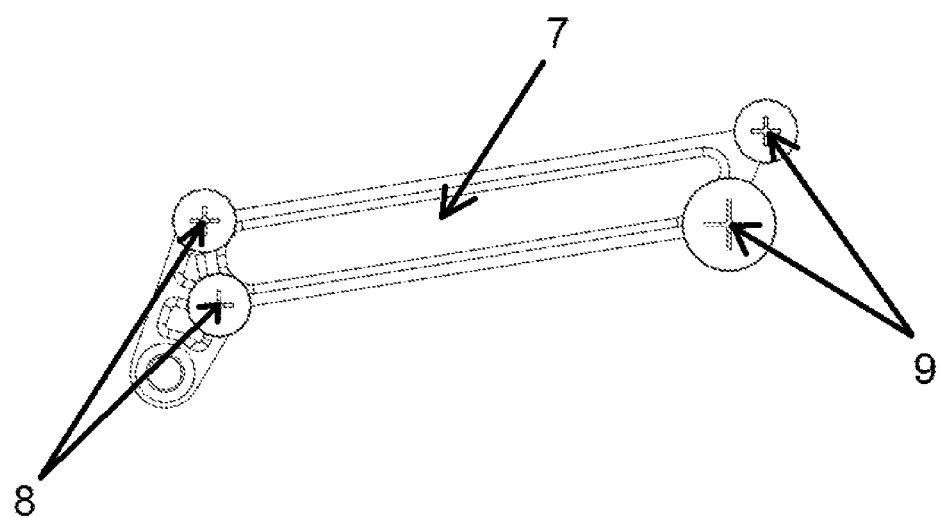
FIG. 5 is a side view of the carriage.

FIG. 5 is a detailed view of carriage 7.

ADVANTAGES OF THE INVENTION

Current designs, as stated above, result in heavy, complicated and difficult to maintain mechanisms. These mechanisms also take much space within the wing structure, thus reducing volume which could be better used for fuel storage, as an example. Furthermore many current designs result in mechanisms protruding outside the wing structure with the necessity of adding fairings resulting in increased drag.

This invention overcomes the disadvantages of most current designs. The compact design, entirely enclosed in the flap structure, it provides a cleaner aerodynamic profile with a consequent reduction in drag and it allows for more space in the aircraft wing structure. It is lighter than current designs. It is easy and cheap to maintain because the design includes access panels where needed. It allows each flap to be individually controlled. This can be of great advantage in the case of asymmetric loading conditions, such as may occur in a military aircraft when a bomb is dropped from one of the wings.

What is claimed:

1. A flap assembly comprising:
a flap containing two halves;
an actuating mechanism entirely contained within the flap, the actuating mechanism containing two motors, each motor located on one of the respective halves of the flap, the motors are interconnected so that either one of the two motors is configured to activate the flap should one of the motors fail to operate, the motors being aligned parallel to one another and to a leading edge of the flap, the actuating device including two shafts, each shaft driven by a respective one of the motors, and extending through a respective side of the flap and is equipped with a pinion at its end, and the actuating mechanism including a carriage attached to each respective side of the flap, each carriage equipped with four rollers;
a respective track bracket located on each side of the flap and attached to wing structure, the pinion and rollers of the actuating mechanism engaging the track bracket to allow movement of the flap with regards to the wing structure.

2. The flap assembly of claim 1, wherein each track bracket incorporates one rack at a bottom and two tracks at a middle and top, respectively, of the track bracket, the tracks are configured with angles which provide a changeable moving path to the flap.

3. The flap assembly of claim 1, wherein each said carriage includes one front hole to support the respective shaft, the four rollers consist of a first and second pair of rollers, the first pair of rollers are located above the shaft and ride on sides of a lower track of the track bracket, the lower track providing a horizontal path for movement of the flap, the second pair of rollers is located at another end of the carriage from the first pair of rollers, and riding on an upper track of the track bracket, the upper track providing a path for the downward movement of the flap.

4. The flap assembly of claim 1, wherein each pinion is driven by the respective motor, wherein when the pinion rotates, it travels along a rack of the respective track bracket, thereby moving the carriage and the flap along the rack, wherein as the carriage moves, the flap rotates about the pinion as a pivot axis.

* * * * *